US009319736B2

(12) United States Patent
Kim

(10) Patent No.: US 9,319,736 B2
(45) Date of Patent: Apr. 19, 2016

(54) APPARATUS AND METHOD FOR EDITING TS PROGRAM INFORMATION AND TS RECORDING DEVICE USING THE SAME

(75) Inventor: Young-jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2009 days.

(21) Appl. No.: 11/774,174

(22) Filed: Jul. 6, 2007

(65) Prior Publication Data

US 2008/0178208 A1 Jul. 24, 2008

(30) Foreign Application Priority Data

Jan. 24, 2007 (KR) .................................. 2007-7652

(51) Int. Cl.

| H04N 9/80 | (2006.01) |
|---|---|
| H04N 21/435 | (2011.01) |
| H04N 21/235 | (2011.01) |
| H04N 21/432 | (2011.01) |
| H04N 21/433 | (2011.01) |
| H04N 21/434 | (2011.01) |
| H04N 21/4385 | (2011.01) |
| H04N 21/44 | (2011.01) |
| H04N 21/475 | (2011.01) |
| H04N 21/84 | (2011.01) |

(52) U.S. Cl.
CPC ........... *H04N 21/435* (2013.01); *H04N 21/235* (2013.01); *H04N 21/4325* (2013.01); *H04N 21/4334* (2013.01); *H04N 21/4348* (2013.01); *H04N 21/4385* (2013.01); *H04N 21/44008* (2013.01); *H04N 21/4756* (2013.01); *H04N 21/84* (2013.01)

(58) Field of Classification Search
CPC ............ H04N 21/235; H04N 21/4325; H04N 21/4334; H04N 21/4348; H04N 21/84; H04N 21/4385; H04N 21/44008; H04N 21/4756; H04N 21/43
USPC ......... 386/228, 239, 241, 248, 278, 286, 323, 386/337
See application file for complete search history.

(56) References Cited

U.S. PATENT DOCUMENTS

| 2004/0055012 | A1* | 3/2004 | Kimball et al. ................ 725/88 |
| 2004/0213552 | A1* | 10/2004 | Kato .............................. 386/69 |

FOREIGN PATENT DOCUMENTS

| KR | 10-1997-0019407 | 4/1997 |
| KR | 10-2004-0082033 | 9/2004 |

OTHER PUBLICATIONS

Korean Office Action issued Jul. 24, 2012 in counterpart Korean Patent Application No. 10-2007-0007652 (5 pages, including English language translation).

*Primary Examiner* — Robert Chevalier
(74) *Attorney, Agent, or Firm* — NSIP Law

(57) ABSTRACT

An apparatus and method for editing transport stream (TS) program information, and a TS recording device using the same, the apparatus including: a demultiplexer that demultiplexes a TS in order to separate the TS into a video stream, an audio stream, and a program information section; a controller that generates new program information using user data obtained from the video stream separated from the TS by the demultiplexer; and a section modifier that modifies the program information section using the new program information generated by the controller. Using the apparatus and method for editing TS program information, the user data can still be used even when the user data is included in a video frame and a recorded program is reproduced at high speed. Thus, controlling the viewing of a program by rating is possible.

27 Claims, 4 Drawing Sheets

FIG. 4

PTC 14(MBC)

– PAT length: 16

00 b0 0d 0c 11 e1 00 00 00 01 e0 10 58 0e 9d 41

– PMT length: 144

```
0     02 b0 8d 00 01 c5 00 00 e0 11 f0 00 02 e0 11 f0
16    00 81 e0 14 f0 0e 0a 04 6b 6f 72 00 81 06 08 b8
32    1b 65 1f 00 05 e0 1f f0 17 14 0d 00 81 00 00 08
48    ff ff ff ff ff ff ff ff 52 01 81 6f 03 00 06 ef
64    0b e2 00 f0 30 14 0d 00 08 00 00 08 ff ff ff
80    ff ff ff ff 52 01 08 66 04 00 f0 00 06 13 16 80
96    00 00 04 01 00 00 00 0f e2 00 00 df e7 00 00 00
112   df e7 ff 01 01 0c e2 01 f0 12 14 0d 00 10 00 00
128   08 ff ff ff ff ff ff ff ff 52 01 10 a5 be 7c 4e
```

(a)

PAT length: 16

00 b0 0d 0c 11 e1 00 00 00 01 e0 10 58 0e 9d 41

PMT length: 162

```
0     02 b0 9f 00 01 c5 00 00 e0 11 f0 12 87 12 c1 01
16    01 00 f4 0c 01 65 6e 67 01 00 00 04 fd fd 02 e0
32    11 f0 00 81 e0 14 f0 0e 0a 04 6b 6f 72 00 81 06
48    08 b8 1b 65 1f 00 05 e0 1f f0 17 14 0d 00 81 00
64    00 08 ff ff ff ff ff ff ff 52 01 81 6f 03 00
80    06 ef 0b e2 00 f0 30 14 0d 00 08 00 00 08 ff ff
96    ff ff ff ff ff ff 52 01 08 66 04 00 f0 00 06 13
112   16 80 00 00 04 01 00 00 00 0f e2 00 00 df e7 00
128   00 00 df e7 ff 01 01 0c e2 01 f0 12 14 0d 00 10
144   00 00 08 ff ff ff ff ff ff ff ff 52 01 10 a5 be
160   7c 4e
```

(b)

APPARATUS AND METHOD FOR EDITING TS PROGRAM INFORMATION AND TS RECORDING DEVICE USING THE SAME

CROSS-REFERENCE TO RELATED APPLICATION

This application claims the benefit of Korean Application No. -2007-7652 filed on Jan. 24, 2007 in the Korean Intellectual Property Office, the disclosure of which is incorporated herein by reference.

BACKGROUND OF THE INVENTION

1. Field of the Invention

Aspects of the present invention relate to recording transport stream (TS) data, and more particularly, to an apparatus and method for editing program information in order to preserve user data of TS data.

2. Description of the Related Art

Generally, digital broadcast program providers can prevent certain viewers from viewing certain programs by presetting program ratings for each program and including the preset program rating in a transport stream (TS). For example, a rating according to age groups in order to stop minors from viewing adult programs is generally included in the TS. However, even when information about the rating is included in the TS, a viewer may be able to view the program by recording the program and reproducing the program at high speed. The reason is as follows.

FIGS. 1A through 1C are diagrams illustrating one of the conventional syntax structures generally employed in a TS packet for digital broadcast. The conventional syntax structure complies with ISO/IEC 13818-1, alias MPEG 2, which is the standard.

FIG. 1A illustrates elementary streams, ES1 and ES2, including video and/or audio data. Such elementary streams are combined with header information in order to form a packetized elementary stream (PES) packet, as illustrated in FIG. 1B. Also, the PES packets are combined with program information data (such as program and system information protocol (PSIP) data) and then included in a data portion of a TS packet, as illustrated in FIG. 1C. PSIP is an example of program information. Such program information contains auxiliary information required when reproducing a program using the TS packets. PSIP includes a program association table (PAT), a program mapping table (PMT), and an event information table (EIT). The PMT includes a program number, a packet identifier (PID) of TS packets forming the program, and auxiliary information. The PAT includes a program number and the PMT.

When user data (such as a rating) is included in the PMT or EIT of the PSIP, viewing of a program is restricted by the rating even when the recorded program is reproduced at high speed because the PSIP is also parsed during the reproduction at high speed.

However, when the user data (such as the rating) is included in an extended data service (XDS), restricting the viewing of a program by the rating may not be possible. This is because the XDS is included in a video stream (or a PES packet). When the recorded program is reproduced at high speed, part of the video stream is not parsed and reproduced. Accordingly, when the XDS included in the video stream is not parsed/reproduced, it is not possible to restrict a viewing of a program according to the rating.

SUMMARY OF THE INVENTION

Aspects of the present invention provide an apparatus and method for editing TS program information that does not lose user data while reproducing a recorded TS program at high speed, and a TS program recording device using the apparatus.

According to an aspect of the present invention, there is provided an apparatus for editing TS program information, the apparatus including: a demultiplexer to demultiplex a TS in order to separate the TS into a video stream, an audio stream, and a program information section; a controller to generate new program information using user data obtained from the video stream separated from the TS by the demultiplexer; and a section modifier to modify the program information section using the new program information generated by the controller.

According to another aspect of the present invention, there is provided a TS recording device including: a controller to generate new program information using user data obtained from a video stream included in a TS; a stream recorder to extract packets forming a program from the TS that is to be recorded, and to temporarily store the extracted packets; a modifier to modify the packets stored in the stream recorder using the new program information generated by the controller; and a memory to store the packets modified by the modifier.

According to yet another aspect of the present invention, there is provided a method of editing TS program information, the method including: separating a TS into a video stream, an audio stream, and a program information section by demultiplexing the TS; obtaining user data from the separated video stream; generating new program information using the user data; and modifying the program information section using the new program information.

According to another aspect of the present invention, there is provided a computer readable recording medium having recorded thereon a program for executing a method of editing TS program information, the method including: separating a TS into a video stream, an audio stream, and a program information section by demultiplexing the TS; obtaining user data from the separated video stream; generating new program information using the user data; and modifying the program information section using the new program information.

According to still another aspect of the present invention, there is provided a method of recording transport stream (TS) program information, the method including: generating new program information to include user data obtained from a video stream included in a TS; extracting packets forming a program from the TS that is to be recorded; modifying the packets to include the new program information; and storing the modified packets.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 illustrates program information tables generated according to an embodiment of the present invention.

DETAILED DESCRIPTION OF THE EMBODIMENTS

Figures 1A, 1B, 1C:
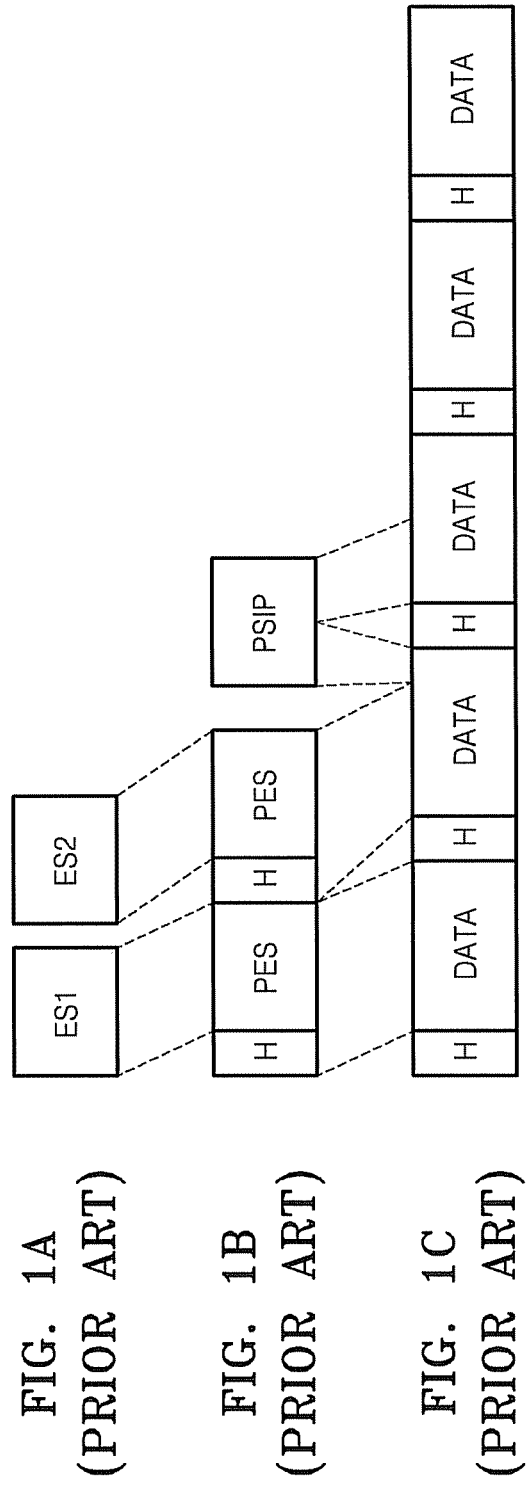
FIGS. 1A through 1C are diagrams illustrating a conventional syntax structure employed in a transport stream (TS) packet for digital broadcast.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, program rating is used as an example of user data included in a video stream for convenience. However, user data according to aspects of the present invention is not limited to program rating, and may include other types of information, such as an electric program guide (EPG), a caption, or the like.

Figure 2:
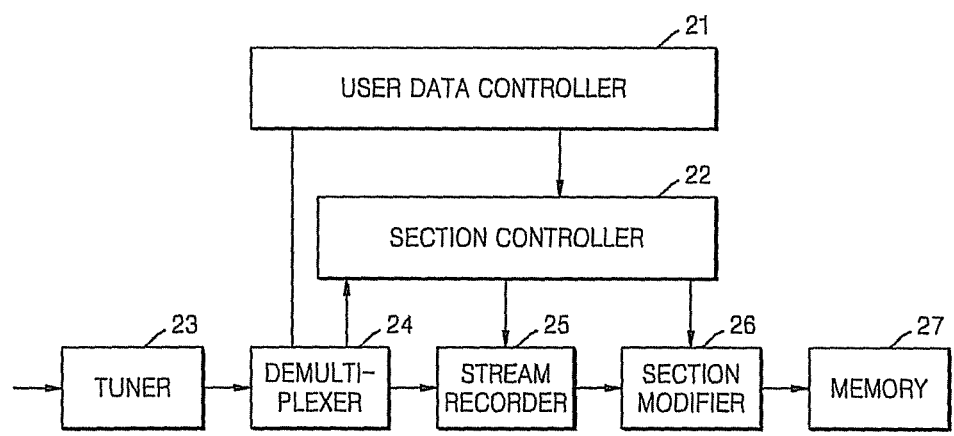
FIG. 2 is a block diagram illustrating a TS recording device for recording a TS program including an apparatus for editing TS program information according to an embodiment of the present invention.

FIG. 2 is a block diagram illustrating a transport stream (TS) recording device for recording a TS program including an apparatus for editing TS program information according to an embodiment of the present invention.

Referring to FIG. 2, a tuner 23 receives a broadcast signal from an antenna, selects a channel selected by a viewer from the broadcast signal, and then obtains a corresponding TS by demodulating the selected channel.

A demultiplexer 24 demultiplexes the TS obtained by the tuner 23 in order to separate the TS into TS data (i.e., to separate the TS into a video stream, an audio stream, and a program information section). The TS data includes a plurality of program data according to the MPEG 2 standard.

A user data controller 21 obtains rating data by parsing a user data area (for example, extended data services (XDS)) included in the video stream separated by the demultiplexer 24. The user data controller 21 transmits the rating data to a section controller 22.

The section controller 22 parses program information (such as program and system information protocol (PSIP) data) separated by the demultiplexer 24. For example, the section controller 22 parses a program association section (PAS) in order to obtain a packet identification (PID) of packets forming a program that a viewer desires to record. The PID obtained from a program association table (PAT) included in the PAS is a PID of a program mapping section (PMS). By parsing the PID of the PMS, a PID of video packets forming each program, a PID of audio packets, and a PID of a program information section can be obtained. Then, the section controller 22 transmits the PIDs forming the program to a stream recorder 25.

Furthermore, the section controller 22 generates a new PAT by extracting program information related to the program that the viewer desires to record, based on section information obtained by parsing the program information. At the same time, the section controller 22 generates a new program mapping table (PMT) including the rating data received from the user data controller 21. The new PMT includes a content advisory descriptor. Information about the rating is recorded in the content advisory descriptor. Next, the section controller 22 transmits the newly generated PAT and PMT to a section modifier 26.

The stream recorder 25 extracts a video packet, an audio packet, and a program information section packet corresponding to the PIDs forming the program that the viewer desires to record from among the TS data including a plurality of program data received from the demultiplexer 24. The stream recorder 25 receives the corresponding PIDs from the section controller 22. Moreover, the stream recorder 25 temporarily stores the extracted video packet, the extracted audio packet, and the extracted program information section packet.

The section modifier 26 modifies section data using tables received from the section controller 22. In other words, the section modifier 26 modifies the PAS from among the program information received from the stream recorder 25 using the newly generated PAT, and modifies the PMS using the newly generated PMT.

Once the section modifier 26 finishes modifying the sections (or the program information), the TS data is stored (or recorded) in a memory 27 as a TS file.

It is understood that according to aspects of the present invention, the section controller 22 and the user data controller 21 can each be physically realized as an independent controller or processor, or can be realized as one controller (such as a central processing unit (CPU)).

Figure 3:
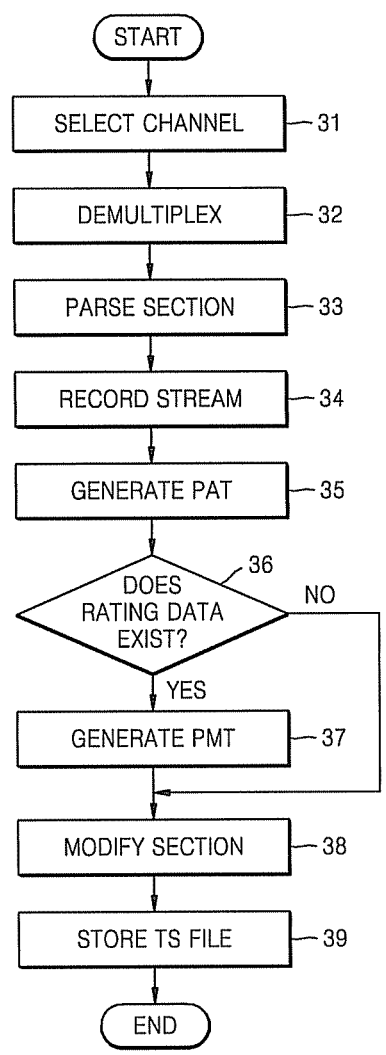
FIG. 3 is a flowchart illustrating a method of editing TS program information according to an embodiment of the present invention.

FIG. 3 is a flowchart illustrating a method of editing TS program information according to an embodiment of the present invention.

In operation 31, a TS of a specific channel including a program that a viewer desires to record is filtered and separated from a received digital broadcast signal.

In operation 32, the TS filtered in operation 31 is separated into TS data (i.e., the TS is separated into a video stream, an audio stream, and a program information section).

In operation 33, the program information section separated in operation 32, is parsed in order to obtain packet identifications (PIDs) of packets forming the program that the viewer desires to record. Specifically, a program association section (PAS) is parsed.

In operation 34, a video packet, an audio packet, and a program information session packet corresponding to the PIDs are obtained from among the TS data and recorded. The PIDs are obtained in operation 33.

In operation 35, a new program association table (PAT) is generated by extracting program information related to the program that the viewer desires to record, based on a PAS obtained by parsing the program information in operation 33.

In operation 36, it is determined whether rating data is included in the video stream by parsing a user data area (such as extended data services (XDS)) included in the video stream. When rating data is not included, operation 37 is omitted and operation 38 is performed.

When rating data is included in the video stream, a new program mapping table (PMT) that includes a content advisory descriptor having the rating data is generated in operation 37.

In operation 38, the PAS and/or a program mapping section (PMS) in the program information is modified. The PAS is modified using the PAT generated in operation 35. Also, when the new PMT is generated in operation 37, the PMS is modified using the PMT.

The modified TS data is stored in a memory as a TS file in operation 39.

The order of the operations of the method of editing TS program information according to aspects of the present invention is not limited to the order illustrated in FIG. 3. In other words, operations 31 through 39 can be performed in a different order. For example, operation 35 and operations 36 and 37 can be swapped.

FIG. 4 illustrates a PAT and a PMT generated according to an embodiment of the present invention. The PAT includes a PID of one PMT, and the PMT includes a content advisory descriptor.

Aspects of the present invention can also be embodied as computer-readable codes on a computer-readable recording medium. The computer-readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer-readable recording medium can also be distributed over network-coupled computer systems so that the computer-readable code is stored and executed in a distributed fashion.

Using the apparatus and method for editing TS program information according to aspects of the present invention, a rating limitation of viewers is possible even when the user data is included in the video stream and the recorded program is reproduced at high speed, since the user data can be obtained from the video stream and included in a modified program mapping table.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for editing transport stream (TS) program information, the apparatus comprising:
    a demultiplexer to demultiplex a TS in order to separate the TS into a video stream, an audio stream, and a program information section;
    a controller to generate new program information using user data obtained from the video stream separated from the TS by the demultiplexer;
    a section modifier to modify the TS by modifying the program information section to include the new program information generated by the controller; and
    a memory to store the modified TS, which includes the video stream and the audio stream and the modified program information section.

2. The apparatus as claimed in claim 1, wherein the user data is included in extended data services (XDS) included in the video stream.

3. The apparatus as claimed in claim 1, wherein the user data is a rating for restricting viewing.

4. The apparatus as claimed in claim 1, wherein the controller comprises:
    a user data controller to obtain the user data from the video stream; and
    a section controller to obtain packet identifiers (PID) of packets forming a program that a viewer desires to record by parsing a program association section (PAS) of the program information section.

5. The apparatus as claimed in claim 1, wherein the controller comprises:
    a user data controller to obtain the user data from the video stream.

6. The apparatus as claimed in claim 1, wherein the controller comprises:
    a section controller to obtain PIDs of packets forming a program that a viewer desires to record by parsing a PAS of the program information section and obtaining the PIDs from a program association table (PAT) included in the PAS.

7. The apparatus as claimed in claim 4, wherein the section controller generates a new program mapping table (PMT), which is the new program information, using the user data received from the user data controller.

8. The apparatus as claimed in claim 7, wherein the new PMT comprises a content advisory descriptor and the user data is recorded in the content advisory descriptor.

9. The apparatus as claimed in claim 7, wherein the section modifier modifies a program mapping section of the program information section using the new PMT.

10. The apparatus as claimed in claim 6, wherein the section controller generates a new PAT by extracting program information related to the program that the viewer desires to record.

11. The apparatus as claimed in claim 10, wherein the section modifier modifies the PAS using the new PAT.

12. A transport stream (TS) recording device comprising:
    a controller to generate new program information to include user data obtained from a video stream included in a TS;
    a stream recorder to extract packets forming a program from the TS that is to be recorded, and to temporarily store the extracted packets;
    a modifier to modify the packets stored by the stream recorder to include the new program information generated by the controller; and
    a memory to store the packets modified by the modifier along with the video stream in a same TS file.

13. The device as claimed in claim 12, wherein the user data is a rating for restricting viewing.

14. The device as claimed in claim 12, further comprising:
    a demultiplexer to demultiplex the TS in order to separate the TS into the video stream, an audio stream packet, and a program information section packet, such that the modifier modifies the program information section packet to include the new program information.

15. A method of editing transport stream (TS) program information, the method comprising:
    separating a TS into a video stream, an audio stream, and a program information section by demultiplexing the TS;
    obtaining user data from the separated video stream;
    generating new program information to include the user data;
    modifying the TS by modifying the program information section to include the new program information; and
    storing the modified TS, which includes the video stream, the audio stream, and the modified program information section in a memory.

16. The method as claimed in claim 15, wherein the user data is a rating for restricting viewing.

17. The method as claimed in claim 15, wherein the new program information is a program mapping table (PMT).

18. The method as claimed in claim 17, further comprising:
    determining whether the user data is included in the video stream,
    wherein the new program information is not generated and the program information section is not modified if the user data is not included in the video stream.

19. The method as claimed in claim 17, wherein the modifying of the program information section comprises modifying a program mapping section of the program information section using the PMT.

20. The method as claimed in claim 15, wherein the generating of the new program information comprises:
obtaining packet identifiers (PIDs) of packets forming a program that a viewer desires to record by parsing a program association section (PAS) of the program information section and obtaining the PIDs from a program association table (PAT) included in the PAS.

21. The method as claimed in claim 20, wherein the generating of the new program information further comprises:
generating a new PMT, which is the new program information, using the user data.

22. The method as claimed in claim 21, wherein the PMT comprises a content advisory descriptor and the user data is recorded in the content advisory descriptor.

23. The method as claimed in claim 20, further comprising:
generating a new PAT by extracting program information related to the program that the viewer desires to record; and
modifying the PAS using the new PAT.

24. A non-transitory computer readable recording medium encoded with the method of claim 15 implemented by a computer.

25. A method of recording transport stream (TS) program information, the method comprising:
generating new program information to include user data obtained from a video stream included in a TS;
extracting packets forming a program from the TS that is to be recorded;
modifying the packets to include the new program information; and
storing the modified packets along with the video stream in a same TS file.

26. The method as claimed in claim 25, wherein the user data is a rating for restricting viewing.

27. A non-transitory computer readable recording medium encoded with the method of claim 25 implemented by a computer.

* * * * *